United States Patent
Haskell et al.

(10) Patent No.: US 6,674,796 B1
(45) Date of Patent: Jan. 6, 2004

(54) STATISTICAL MULTIPLEXED VIDEO ENCODING FOR DIVERSE VIDEO FORMATS

(75) Inventors: Paul Haskell, Saratoga, CA (US); Dackary Busch, Spokane, WA (US)

(73) Assignee: Harmonic, Inc., Sunnyvale, CA (US)

( * ) Notice: Subject to any disclaimer, the term of this patent is extended or adjusted under 35 U.S.C. 154(b) by 0 days.

(21) Appl. No.: 09/504,335

(22) Filed: Feb. 14, 2000

(51) Int. Cl.$^7$ .............................. H04B 1/66; H04N 7/12; G06K 9/32
(52) U.S. Cl. ................. 375/240.01; 382/298; 348/385.1
(58) Field of Search ................... 375/240.01, 240.02, 375/240, 240.03, 240.29, 240.12; 348/385.1, 387.1, 388.1, 404.1, 405.1, 423.1, 441, 386.1; 382/239, 232, 298; 370/538, 468

(56) References Cited

U.S. PATENT DOCUMENTS

| | | | | |
|---|---|---|---|---|
| 5,115,309 A | * | 5/1992 | Hang ...................... | 348/388.1 |
| 5,550,590 A | * | 8/1996 | Sakazawa et al. ....... | 348/386.1 |
| 5,861,919 A | * | 1/1999 | Perkins et al. ........... | 348/385.1 |
| 6,038,256 A | * | 3/2000 | Linzer et al. .......... | 375/240.12 |
| 6,094,457 A | * | 7/2000 | Linzer et al. .......... | 375/240.12 |
| 6,167,084 A | * | 12/2000 | Wang et al. ........... | 375/240.02 |
| 6,192,083 B1 | * | 2/2001 | Linzer et al. .......... | 375/240.29 |
| 6,259,733 B1 | * | 7/2001 | Kaye et al. ................. | 375/240 |

* cited by examiner

Primary Examiner—Gims Philippe
(74) Attorney, Agent, or Firm—Proskauer Rose LLP

(57) ABSTRACT

A statistical multiplexing apparatus and method for encoding and combining a diversity of video signal resolutions and formats. Higher resolution signals are reduced to lower resolution signals for simplifying the a priori statistics gathering process. Alternately, input video signals in multiple formats are converted to a single common format prior to their application to an a priori statistics gatherer. A storage device contains the a priori statistics which are indicative of the encoding complexity of the video signals from which the encoded video bit streams will be generated. The original video signals are applied to encoders which compress the signals in accordance with bit allocation decisions generated by a statistics computer. The statistics computer uses the a priori statistics from the storage device to generate bit allocation decisions. Subsequently, the statistics computer may use both the a priori statistics and the a posteriori statistics received from the encoders in allocating bits. The resulting compressed video bit streams are applied to a multiplexer and combined into a single multiplexed bit stream for transmission on a single channel.

16 Claims, 3 Drawing Sheets

STATISTICAL MULTIPLEXED VIDEO ENCODING FOR DIVERSE VIDEO FORMATS

CROSS-REFERENCES AND RELATED APPLICATIONS

The following patent contains subject matter which is related to the subject matter of this application.

1. U.S. Pat. No. 6,005,621, entitled "Multiple Resolution Video Compression," filed on Jul. 22, 1997 and issued on Dec. 21, 1999 for Elliot Linzer and Aaron Wells.

The following patent applications contain subject matter which is related to the subject matter of this application.

1. U.S. patent application Ser. No. 08/775,313, entitled "Statistical Multiplexed Video Encoding Using Pre-Encoding A Priori Statistics and A Priori and A Posteriori Statistics", filed on Dec. 31, 1996 for Elliot Linzer and Aaron Wells;
2. U.S. patent application Ser. No. 09/084,690, entitled "Delay Balanced Video Encoder System," filed on May 26, 1998 for Elliot Linzer;
3. U.S. patent application Ser. No. 09/196,812, entitled "Video Transcoder with Bitstream Look Ahead for Rate Control and Statistical Multiplexing," filed on Nov. 20, 1998 for Aaron Wells and Elliot Linzer.

The above-listed patent and patent applications are commonly owned by the assignee of this application, and the contents of the above-listed patent applications are incorporated herein by reference.

FIELD OF THE INVENTION

The present invention relates generally to digital video encoding and more particularly to video encoding in which statistical multiplexing is used to combine a diversity of video formats into single multiplexed bit stream, e.g., for transmission on a single channel.

BACKGROUND OF THE INVENTION

Many video encoding applications utilize statistical multiplexing techniques to combine several compressed video bit streams into a single multiplexed bit stream, e.g., for transmission on a single channel. The bit rate of a given compressed stream generally varies with time based on the complexity of the corresponding video signals. A statistical multiplexer attempts to estimate the complexity of the various video frame sequences of a video signal and allocates channel bits among the corresponding compressed video bit streams so as to provide an approximately constant level of video quality across all of the multiplexed streams. For example, a given video frame sequence with a relatively large amount of spatial activity or motion may be more complex than other sequences and therefore allocated more bits than the other sequences.

An example of a statistical multiplexing encoding system is described in M. Perkins & D. Arnstein, *Statistical Multiplexing of Multiple MPEG-2 Video Programs in a Single Channel*, SMPTE J., vol. 104, no. 9, p. 596–599, September, 1995. As described in this reference, multiple encoders each receive a respective program, encode the program, and place their compressed picture data of a video signal of the program in a corresponding buffer of fixed size pending submission to a multiplexer. (As per MPEG-2 parlance, a "program" is a collection of one or more related signals. Herein, a program is presumed to include a video signal but may also include one or more associated audio signals, a close caption text signal, etc.) A multiplexer receives the encoded programs from the multiple encoders, in the form of a bit stream. A different bit rate may be assigned to each bit stream depending on a respective estimate of the number of bits needed by the video bit stream of the corresponding program to achieve the same level of quality as the other programs with which it is multiplexed. (Generally speaking, the bit rate of the video bit stream of a program is variable whereas the bit rates of the audio and other associated bit streams of a program are constant. This invention is illustrated in the context of adjusting only the bit rate of the video bit stream portion of a program.) On the receiving end of the communication, a decoder receives the multiplexed multiple program bit stream and discards the data it does not need (e.g., if the decoder is a set top box, Only the "tuned" or selected program is retained, whereas the data of each non-selected program is discarded). The retained data is inputted to the decoder's input buffer of a fixed size pending decoding. The removal of data from the decoder buffer for decoding is controlled in a strict fashion to effect a constant end-to-end delay for any selected program. In the statistical multiplexing encoding scheme, the relative timing of each to-be-multiplexed program is independent. A first encoder for a first program may have many pictures of compressed data in its buffer pending submission to the mulitiplexer while a second encoder for a second bit stream may have only a few pictures in its buffer pending submission to the multiplexer. A decoder that selects the first program for decoding will be receiving "earlier" pictures than a decoder that selects the second program for decoding. Such a variable delay is eliminated by each decoder lengthening or shortening the amount of time the received pictures spend in the decoder buffer pending decoding to effect the above-noted constant end-to-end delay.

In a prior art patent application, entitled "Statistical Multiplexed Video Encoding Using Pre-Encoding A Priori Statistics and A Priori and A Posteriori Statistics, Ser. No. 08/775,313, an exemplary statistical multiplexer 20 was disclosed in FIG. 3. FIG. 1 of this application shows the same prior art multiplexer, with the same designation numbers.

In the multiplexer 20, n video signals from Video Source 22 are applied to a Statistics Gatherer 24, and also to a Storage Device 28. Statistics Gatherer 24 gathers a priori statistics regarding the n video signals, and stores this set of statistics (27-1, 27-2, . . . 27-n) in a Storage Device 26.

A Statistics Computer 30 retrieves the a priori statistics 27-1, . . . 27-n from Storage Device 26. Concurrently, the n video signals (29-1, 29-2, . . . 29-n) are retrieved from Storage Device 28 and are applied to corresponding Encoders 32-1, 32-2, . . . 32-n. The n video signals are encoded into respective compressed video bit streams, based on the a priori information supplied to Encoders 1, 2, . . . n by Statistics Computer 30.

During the aforementioned encoding process, a posteriori information is generated from Encoders 1, 2, . . . n, and is inputted to Statistics Computer 30. Statistics Computer 30 then utilizes both the pre-stored a priori information and the received a posteriori information to generate an improved bit allocation distribution for the n video signals being encoded.

The resulting compressed bit streams are supplied from Encoders 1, 2, . . . n to inputs of a Multiplexer 34. Multiplexer 34 combines the multiple compressed bit streams into a single multiplexed bit stream outputted on channel output 35.

In a prior art U.S. Pat. No. 6,005,621, entitled "Multiple Resolution Video Compression," a multiple resolution video compression system is disclosed where information used to encode the video signal at one resolution is used to facilitate the encoding process for a different resolution version.

In a prior art patent application, entitled "Video Transcoder with Bitstream Look Ahead for Rate Control and Statistical Multiplexing," Ser. No. 09/196,812, a system is disclosed for decoding and re-encoding a previously encoded video signal. The previously encoded video signal is temporarily stored in a look ahead buffer, where the encoded pictures are scanned to gather information. After a delay, the encoded pictures are then decoded and applied to a re-encoder. The re-encoder utilizes the scanned information, as well as the pictures that follow it, to optimize the encoding applied to each picture.

The aforementioned prior art patent applications utilize look ahead encoding, multiple resolutions, and re-encoding to provide various benefits for encoding and multiplexing. As the video technology state of the art trends toward high resolution (HD) video, however, there is a need to minimize the hardware and processing complexities associated with encoding and multiplexing HD signals.

Furthermore, when the signals from the video source contain a diversity of video formats, the encoding process can become very complex.

Therefore, it is an object of the present invention to provide simplified and economical system configurations for encoding and multiplexing video signals having a diversity of resolutions and formats.

SUMMARY OF THE INVENTION

Figure 1:
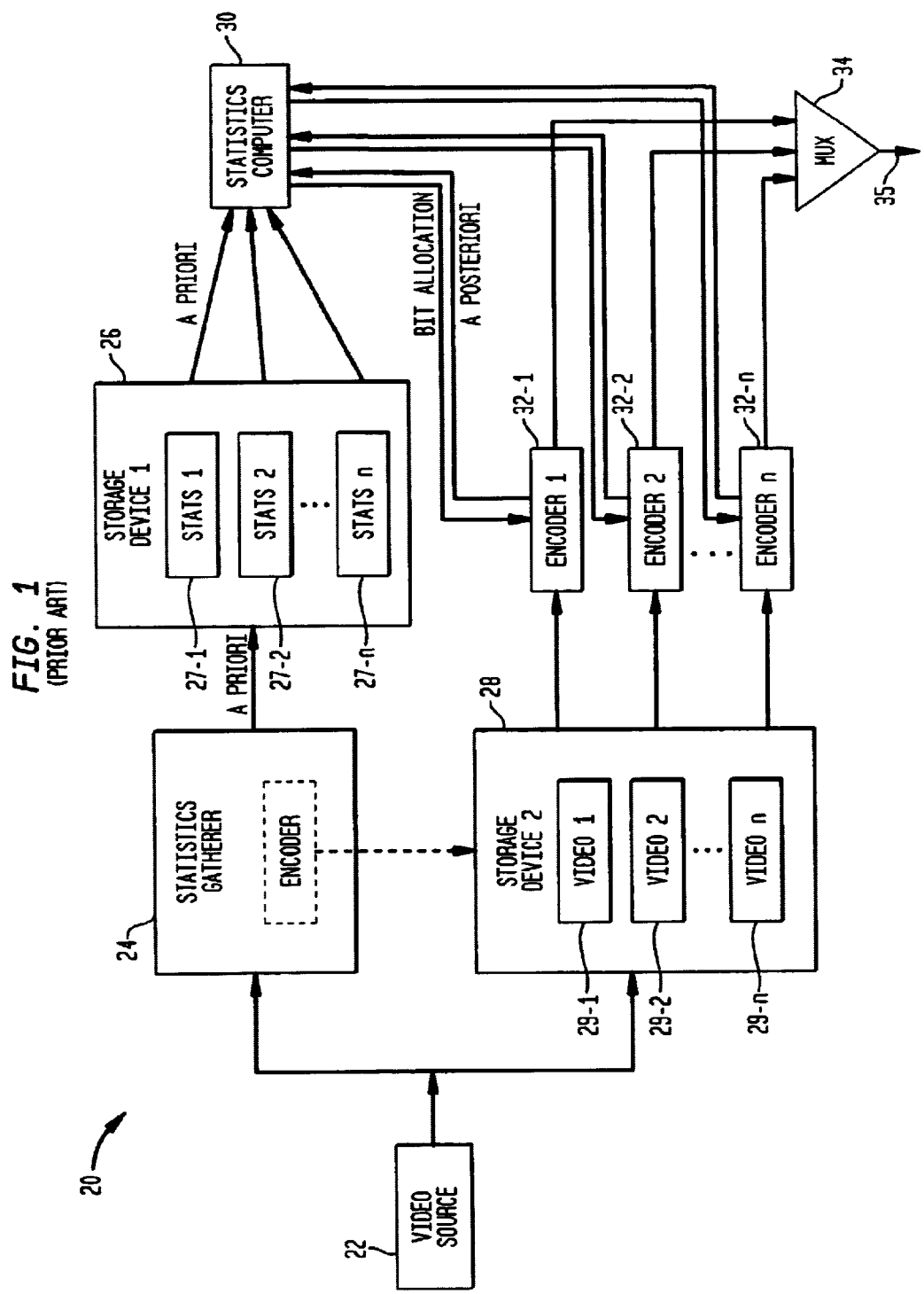
FIG. 1 shows a prior art statistical multiplexer using a priori and a posteriori statistics.

The present invention provides a statistical multiplexing apparatus and method for generating and combining a plurality of encoded video bit streams. The statistical multiplexing of the present invention utilizes pre-stored a priori statistics, indicative of the encoding complexity of a video bit stream of an inputted program, which statistics are gathered while encoding the video bit stream a first time. The video bit stream is then re-encoded, i.e., encoded a second time, at an appropriate rate for transmission. The pre-stored a priori statistics gathered during the first encoding may include a number of bits generated for each compressed picture, an average quantization level, picture types, scene change locations and repeat field patterns. These statistics are very accurate predictions of how difficult the video bit stream will be to encode during the final encoding and therefore the quality across all of the compressed programs will be close to constant.

The present invention also provides a statistical multiplexing apparatus and method for generating and combining a plurality of compressed video bit streams using pre-stored a priori statistics gathered on the inputted video signals and a posteriori statistics gathered during the actual (final) encoding of the video bit streams. The a priori statistic metric may include interpixel differences within a picture or between pictures, statistics gathered from a preliminary encoding step (if performed) such as the number of bits generated for each compressed picture, repeat field pattern, average quantization level, scene change locations and picture types.

A statistics computer in the statistical multiplexer uses the pre-stored a priori statistics in conjunction with conventional a posteriori statistics generated during actual encoding to determine an appropriate bit allocation for the to-be-multiplexed bit streams. A statistical multiplexer in accordance with the present invention thus has access to additional information regarding the encoding complexity of the to-be-encoded and to-be-multiplexed video signals, and can therefore generate more accurate bit allocations and better maintain consistent video quality across multiple compressed video bit streams.

An exemplary embodiment of the invention includes a video source which generates a plurality of video signals (e.g., a plurality of program signals which each contains a video signal). The video signals are applied to a video scaler which reduces the resolution of the video signals. The reduced resolution video signals are then applied to a statistics gatherer which generates the above-noted pre-stored a priori statistics and stores the statistics in a first storage device. The original video signals are stored in a second storage device. Encoders retrieve the original video signals from the second storage device and encode the original video signals in accordance with a bit allocation determined by a statistics computer. The statistics computer determines the bit allocation based on pre-stored a priori statistics retrieved from the first storage device in conjunction with conventional a posteriori statistics supplied from the encoders. The resulting encoded video bit streams are supplied to a multiplexer which combines the video bit streams into a single multiplexed bit stream (e.g., for output or transmission on a single channel).

Another exemplary embodiment of the invention uses a video source containing standard definition (SD) video signals, which are applied to a statistics gatherer for generating a priori statistics for a statistics computer. The SD video signals are also applied to an SD-to-HD up-converter, which converts the SD signals to HD (high definition) signals. The up-converted HD signals are then encoded using a bit allocation generated by the statistics computer. The encoder generates a posteriori statistics for the statistics computer, which then utilizes both the a priori and a posteriori statistics for adjusting the bit allocation information.

In yet another exemplary embodiment of the invention, the video source contains multiple format video signals, which are applied to a common format converter. The multiple format signals are converted to a single common format by the common format converter, and are then applied to a statistics gatherer. The statistics gatherer generates a priori statistics for a statistics computer, which determines a bit allocation. The original multiple format signals are encoded by an encoder, using the bit allocation based on the a priori data. The encoder then generates a posteriori data for the statistics computer, which then utilizes both the a priori and a posteriori data to optimize the bit allocation.

These and other features and advantages of the present invention will become more apparent from the accompanying drawings and the following detailed description.

DETAILED DESCRIPTION OF THE INVENTION

The present invention will be illustrated below using a number of exemplary statistical multiplexers suitable for use in video encoding applications. It should be understood, however, that the invention is more broadly applicable to any application which involves bandwidth allocation between multiple encoded bit streams. Furthermore, although particularly well-suited for use in MPEG-2 applications, the invention may be utilized with encoded bit streams generated using other encoding techniques. The term "pre-stored statistics" should be understood to include any type of information indicative of the encoding complexity of a given signal which is generated before a bit allocation decision is made for that program. This information may be stored in a storage device as in the illustrative embodiments, in an internal random-access memory of a statistics computer, or elsewhere as required in a particular application.

Figure 2:
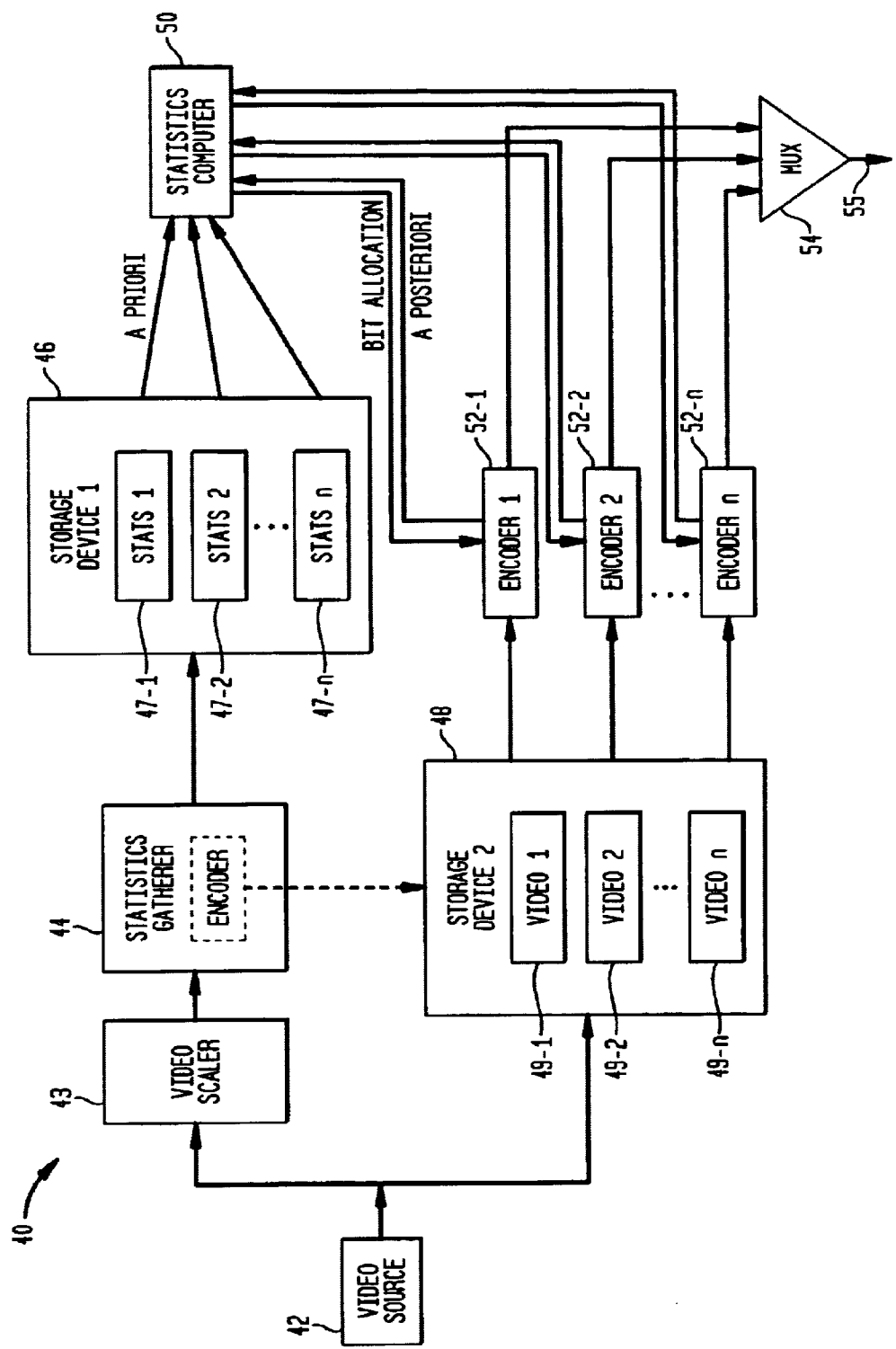
FIG. 2 shows a first embodiment of a multiple resolution statistical multiplexer in accordance with the present invention.

FIG. 2 shows an exemplary statistical multiplexer 40 in accordance with a first exemplary embodiment of the present invention. The statistical multiplexer 40 includes a video source 42, which generates a number n of video signals. The n video signals are applied to a video scaler 43, which reduces the resolution of the n video signals. For example, the n video signals may be high definition (HD) signals, which are down-converted to standard definition (SD) signals.

Alternately, the n video signals in video source 42 may be SD signals. In this case, the SD signals would be scaled to a reduced resolution by video scaler 43. Look ahead encoding would be performed by statistics gatherer/encoder 44 on the reduced resolution signals, and the original SD resolution signals would be encoded using the results of the reduced resolution look ahead step.

Again, the benefit of this embodiment is a reduction in the complexity and expense of look ahead encoding at a lower resolution.

The reduced resolution n video signals are then applied to a statistics gatherer 44 which gathers a priori statistics regarding the reduced resolution n video signals. The statistics gatherer 44 stores a set of a priori statistics 47-i, i=1, 2 . . . n for each of the reduced resolution n video signals on a first storage device 46. The video source 42 also supplies the video signals to a second storage device 48. The second storage device 48 thus includes n stored video signals 49-i. The first and second storage devices 46, 48 may be optical or magnetic hard drives, disk arrays or electronic memory. The first and second storage devices 46 and 48 can also be combined into a single storage device.

Optionally, the statistics gatherer 44 may include an encoder for encoding each received video signal. Encoding may be performed according to, for example, the MPEG-2 standard as disclosed in ISO/IEC IS 13818-1,2,3. The contents of these standards documents are incorporated herein by reference. In such a case, the a priori statistics may be generated during this pre-encoding of the video signals. Furthermore, the statistics gatherer 44 may output the compressed video bit streams produced by the encoding for storage in the second storage device 48 instead of the uncompressed video signals outputted from the video source 42. Preferably, however, the uncompressed video signals are stored in the second storage device 48, and certain encoding results, e.g., motion estimation results, such as optimal motion vectors, inter/intra decisions, coded/non-coded macroblock decisions, etc., are stored in the second storage device 48 along with the uncompressed video signals.

Although the statistical multiplexer 40 is shown in a form suitable for non-real-time encoded video signals, it can easily be adapted for real-time encoding. For instance, one video source 42 and a corresponding video scaler and a statistics gatherer can be provided for each video signal to be encoded in parallel. The second storage device 48 in this embodiment need not store the entire video signal of the event of the corresponding program. Rather, as described in greater detail below, only temporary storage for a limited number of frames need be provided.

A statistics computer 50 retrieves the pre-stored a priori statistics 47-i from the first storage device 46. The corresponding stored full resolution video signals 49-i are retrieved from the second storage device 48 and applied to respective encoders 52-i. The encoders 52-i may be configured to operate in accordance with the MPEG-2 standard. Each encoder 52-i produces a compressed video bit stream. Alternatively, the encoders 52-i are transcoders which include decoders. The decoders are for first decoding the retrieved video signals 49-i, in the event the retrieved video signals 49-i are already compressed. The transcoder 52-i then re-encode the video signals 49-i. Preferably, the retrieved video signals 49-i are uncompressed but include encoding information previously determined during pre-encoding by the statistics gatherer 44. The encoders 52-i encode the video signals using such retrieved encoding information.

The statistics computer 50 also receives additional information in the form of a posteriori statistics from the encoders 52-i regarding the video signals being encoded. The statistics computer 50 utilizes the pre-stored a priori statistics 47-i and the additional a posteriori information from the encoders 52-i to allocate the available channel bits among the n video signals to be encoded. The resulting compressed bit streams are supplied from the encoders 52-i to inputs of a multiplexer 54. The multiplexer 54 combines the multiple compressed bit streams into a single multiplexed bit stream outputted on channel output 55. The statistics computer 50 may be implemented as an application-specific integrated circuit (ASIC), microprocessor or other digital data processor programmed to provide the described processing functions. Some or all of the functions of statistics computer 50 may be provided by an integrated processing device which also provides certain functions of the statistics gatherer 44 as well as one or more of the encoders 52-i.

The statistics computer 50 in the statistical multiplexer 40 utilizes pre-stored a priori information about the reduced resolution video bit stream that each encoder 52-i is about to encode at full resolution before allocating bits among the encoders. As such, the inventive multiplexer provides the benefits of look ahead encoding for HD signals without the complexity and expense of two HD encoding steps per signal. Furthermore, this use of both pre-stored a priori and a posteriori statistics is particularly useful in situations in which a portion of a video bit stream that the statistics computer 50 determined would be simple to encode turns out to be much more difficult to encode at a specific allocated bit rate. The statistics computer 50 of FIG. 2 has more information available to it than a conventional statistics computer, and can therefore make more accurate bit allocation decisions and better maintain video quality across multiple encoded bit streams.

As per the statistical multiplexing paradigm, the video signals outputted from the video source 42 have mutually independent timing. The encoders 52-i independently encode the received video signals 49-i in an asynchronous fashion—the picture rates of the encoders 52-i are not synchronized. Likewise, in multiplexing the compressed video bit streams, the instantaneous picture rates of each compressed video signal in the multiplexed bit stream are independent and fluctuate with respect to each other.

Figure 3:
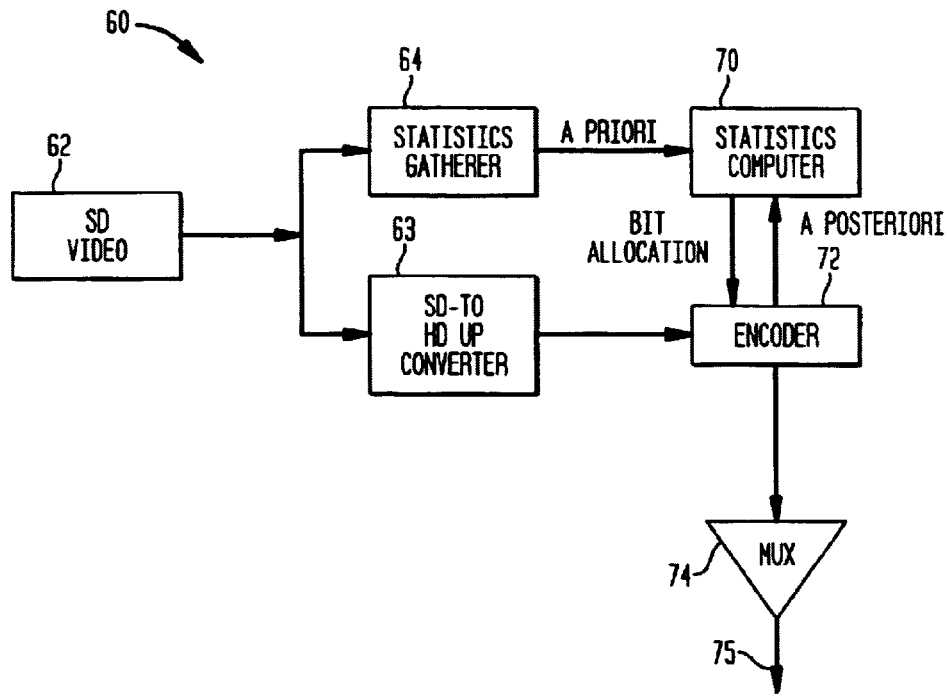
FIG. 3 shows a second embodiment of a statistical multiplexer in accordance with the present invention.

FIG. 3 shows a different embodiment of a multiple resolution statistical multiplexer 60. In this embodiment, a video source 62 contains standard definition (SD) signals, or signals having a relatively low resolution. For simplicity purposes, only a single video bit stream is shown in the drawing, but the inventive configuration is equally applicable to n video signals, as shown in FIG. 2.

The SD video is applied to a statistics gatherer 64, which generates a priori data for a statistics computer 70. At the same time, the SD video from source 62 is applied to an SD-to-HD up-converter 63. Up-converter 63 outputs HD (high definition/high resolution) video to an encoder 72. Statistics computer 70 provides bit allocation information to encoder 72, based on a priori data from statistics gatherer 64. As encoder 72 encodes the HD video, a posteriori data is generated, and fed back to statistics computer 70. Statistics computer 70 then utilizes both the a priori and a posteriori data to optimize the bit allocation information applied to encoder 72.

Similarly to the system 40 of FIG. 2, the multiple resolution statistics multiplexer 60 of FIG. 3 gathers a priori data at low resolution (SD), and encodes at high resolution (HD), thereby avoiding the additional complexity and expense of two HD computational steps, as compared to a single HD encoding step.

Figure 4:
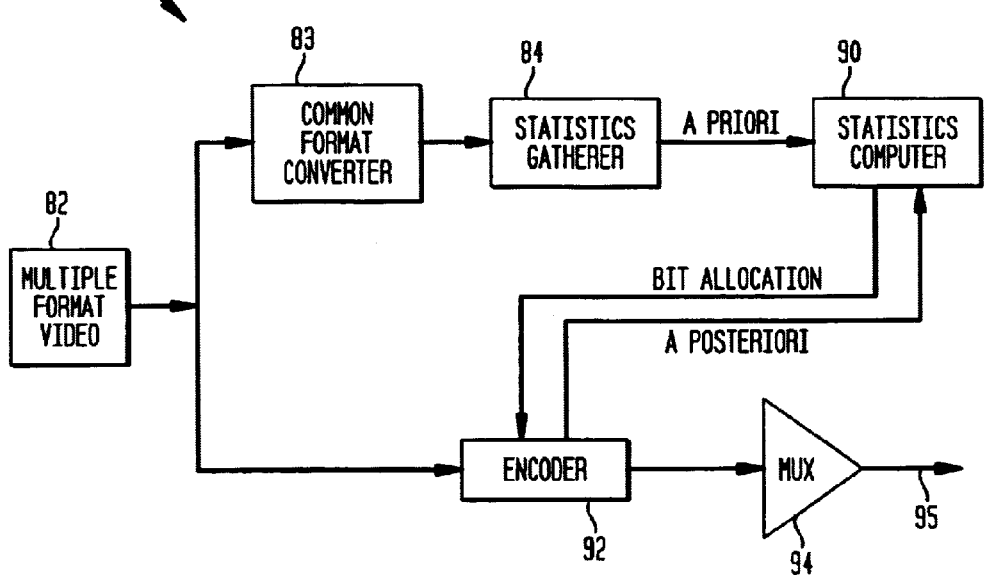
FIG. 4 shows a single signal format embodiment of a statistical multiplexer in accordance with the present invention.

FIG. 4 shows another embodiment of a statistical multiplexer 80, in which a video source 82 contains a diversity of video signals with different formats, such as SD, 480 P, 720 P, 1080 I, etc. In this embodiment, the multiple format video signals are applied to a common format converter 83, which outputs the corresponding video streams in a single, common signal format. These signals are applied to statistics gatherer 84, which generates a priori data from the single signal format video, and inputs this (look ahead) a priori data to a statistics computer 90.

Concurrently, video source 82 applies the original multiple format signals to encoder 92 for final encoding. Statistics computer 90 supplies bit rate allocation information to encoder 92, based on the single signal a priori data, and then receives a posteriori data from encoder 92, for further refinement of bit allocation distribution.

The encoded multiple format video signals are inputted to a multiplexer 94, where they are combined into a single multiplexed bit stream outputted on channel output 95.

Thus, inventive system 80 provides the benefit of look ahead encoding of a diversity of video formats with a single signal format, which can improve the results of look ahead bit allocation.

In short, the above-described inventive embodiments combine the benefits of using both a priori and a posteriori statistics for encoding bit allocations (prior art) with the reduced complexity and expense of one step of high resolution encoding and one step of low resolution (look ahead) encoding, instead of two steps of high resolution pre-encoding and final encoding.

Moreover, an alternate inventive embodiment provides a reduced complexity encoding scheme for a diversity of input video signal formats.

It should be understood that the foregoing description is merely illustrative of the invention. Numerous alternative embodiments within the scope of the appended claims will be apparent to those of ordinary skill in the art. For example, although the multiplexers 54, 74, and 94 are illustrated as combining n encoded video bit streams into a single channel, alternative multiplexers could be used to combine subsets of the n encoded bit streams into several different channels.

The claimed invention is:

1. A method for encoding and multiplexing a plurality of original resolution video signals having mutually independent timing into a single multiplexed bit stream, comprising the steps of:

(a) scaling each original resolution video signal of said plurality of original resolution video signals to produce a plurality of scaled video signals, where each scaled video signal of said plurality of scaled video signals is a reduced resolution version of a corresponding original resolution video signal of said plurality of video signals from which said respective scaled video signal was produced by scaling, (b) processing each scaled video signal of said plurality of scaled video signals to gather a priori statistics from said respective scaled video signal;

(c) statistically allocating a first bit rate to each original resolution video signal of said plurality of original resolution video signals based on said gathered a priori statistics, wherein said first bit rate allocated to each particular original resolution video signal is generated from said a priori statistics gathered for said corresponding scaled video signal that is a reduced resolution version thereof, (d) independently encoding each original resolution video signal of said plurality of original resolution video signals at said respective original resolution to produce a corresponding compressed video bit stream depending on said allocated first bit rate, and (e) combining each of said compressed video bit streams into a multiplexed bit stream.

2. The method of claim 1, wherein said step (d) further comprises:

generating a posteriori statistics regarding each original resolution video signal of said plurality of original resolution video signals, indicating a complexity involved in encoding each of said full resolution video signals, statistically allocating a second bit rate to each of said original resolution video signals based on said a priori and a posteriori statistics generated in said steps (b) and (d), and independently encoding each of said original resolution video signals to produce a corresponding compressed video bit stream depending on said second bit rate allocated in said step (d).

3. The method of claim 1, wherein said step (b) further comprises:

pre-encoding each scaled video signal of said scaled plurality of video signals to generate information to be used in said encoding step (d).

4. The method of claim 1, wherein each original resolution video signal of said plurality of original resolution video signals is a high definition (HD) signal.

5. The method of claim 1, wherein each scaled resolution video signal of said scaled plurality of video signals is a standard definition (SD) signal.

6. The method of claim 1, wherein said plurality of original resolution video signals and/or said plurality of scaled video signals are live or pre-stored signals.

7. A method for encoding and multiplexing a plurality of video signals having mutually independent timing into a single multiplexed bit stream comprising the steps of:

(a) processing each original resolution video signal of said plurality of video signals to gather a priori statistics from said respective original resolution video signal of said plurality of video signals, (b) statistically allocating a first bit rate corresponding to each of said processed video signal of said plurality of video signals based on said generated a priori statistics, (c) processing each original resolution video signal of said plurality of video signals to up-convert said original resolution video signal to a higher resolution, thereby generating a higher resolution video signal corresponding to each respective original resolution video signal, (d) independently encoding each of said higher resolution video signals to produce a corresponding compressed video bit stream depending on said allocated first bit rate, and (e) combining each of said compressed video bit streams into a multiplexed bit stream.

8. The method of claim 7, wherein said step (d) further comprises:

generating a posteriori statistics regarding each of said higher resolution video signals, indicating a complexity involved in encoding each of said higher resolution video signals, statistically allocating a second bit rate to each of said higher resolution video signals based on said a priori and a posteriori statistics generated in said steps (a) and (d), and independently encoding each of said higher resolution video signals to produce a corresponding compressed video bit stream depending on said second bit rate allocated in said step (d).

9. A method for encoding and multiplexing a first plurality of video signals of non-uniform format, in which at least one video signal of said first plurality has a different format than a second video signal of the first plurality, into a single multiplexed bit stream comprising the steps of:

(a) processing said video signals of non-uniform format, including format converting one or more video signals of said first plurality, to produce a second plurality of video signals of common format in which each video signal of said second plurality of common format video signals has the same format, (b) ingathering a priori statistics for each video signal of the second plurality of common format video signals, (c) statistically allocating a first bit rate to each video signal of said first plurality of non-uniform format video signals based on said ingathered a priori statistics, (d) independently encoding each video signal of said first plurality video signals of non-uniform format, including said first and said second video signals that have mutually different formats, to produce a corresponding compressed video bit stream depending on said allocated first bit rate, and (e) combining each of said compressed video bit streams into a multiplexed bit stream.

10. The method of claim 9, wherein said step (d) further comprises:

generating a posteriori statistics for each video signal of said first plurality of video signals of non-uniform format, including said first and second video signals that have mutually different formats, indicating a complexity involved in encoding each of said video signals of said first plurality of non-uniform format video signals, statistically allocating a second bit rate to each of said video signals of said first plurality of non-uniform format video signals based on said a priori and a posteriori statistics generated in said steps (b) and (d), and independently encoding each of said video signals of said first plurality of non-uniform format video signals to produce a corresponding compressed video bit stream depending on said second bit rate allocated in said step (d).

11. A statistical multiplexer for multiplexing plural encoded video signals having mutually independent timing into a single multiplexed bit stream comprising:

(a) a source of plural original resolution video signals, (b) a video scaler, receiving said plurality of original resolution video signals from said video source, for scaling each original resolution video signal of said plurality of original resolution video signals to produce a plurality of scaled video signals, where each scaled video signal of said plurality of scaled video signals is a reduced resolution version of a corresponding original resolution video signal of said plurality of original resolution video signals from which said respective scaled video signal was produced by scaling, (c) a statistics gatherer, receiving said plurality of scaled video signals from said video scaler, for pre-encoding said plurality of scaled video signals, and for generating pre-encoding a priori statistics indicative of a complexity involved in pre-encoding each of said plurality of scaled video signals, (d) a statistics computer, connected to said statistics gatherer, for statistically allocating a first bit rate to each of said original resolution video signals based on said pre-encoding a priori statistics generated in said statistics gatherer, (e) one or more encoders, connected to said statistics computer, for independently re-encoding each of said original resolution video signals to produce a corresponding compressed video bit stream depending on said first bit rate allocated in said statistics computer, and (f) a multiplexer for combining each of said compressed video bit streams with a least one other compressed video bit stream into a multiplexed bit stream.

12. The statistical multiplexer of claim 11, wherein said one or more encoders generates a posteriori statistics regarding one or more of said original resolution video signals, indicating a complexity involved in encoding each of said original resolution video signals, wherein said statistics computer statistically allocates a second bit rate to each of said original resolution video signals based on said a priori and a posteriori statistics generated by said statistics gatherer and said one or more encoders, and wherein said one or more encoders independently encodes each of said original resolution video signals depending on said second bit rate.

13. A statistical multiplexer for multiplexing plural encoded video signals into a single multiplexed bit stream comprising:

(a) a source of standard definition (SD) video signals, (b) an up-converter, receiving said SD video signals, for converting said SD video signals to high definition (HD) video signals, each of said HD video signals having a higher resolution than said respective SD video signal from which said corresponding HD video signal was derived, (c) a statistics gatherer, receiving said SD video signals from said video source, for pre-encoding said SD video signals having mutually independent timing, and for generating pre-encoding a priori statistics indicative of a complexity involved in pre-encoding each of said SD video signals, (d) a statistics computer, connected to said statistics gatherer, for statistically allocating a first bit rate to each of said HD video signals based on said pre-encoding a priori statistics generated in said statistics gatherer for said SD video signals, (e) one or more encoders, connected to said statistics computer, for independently encoding each of said HD video signals to produce a corresponding compressed video bit stream depending on said first bit rate allocated in said statistics computer, and (f) a multiplexer for combining each of said compressed video bit streams with at least one other compressed video bit stream into a multiplexed bit stream.

14. The statistical multiplexer of claim 13, wherein:

said one or more encoders generates a posteriori statistics, regarding one or more of said HD video signals, for indicating a complexity involved in encoding each of said HD video signals, wherein said statistics computer statistically allocates a second bit rate to each of said HD video signals, based on said a priori and a posteriori statistics generated by said statistics gatherer and said one or more encoders, and wherein said one or more encoders independently encodes each of said HD video signals depending on said second bit rate.

15. A statistical multiplexer for multiplexing plural encoded video signals into a single multiplexed bit stream comprising:

(a) a source of a plurality of video signals of non-uniform format, including first and second video signals, where the format of said first video signal is different than the format of the second video signal, (b) a common format converter, receiving said plurality of video signals of non-uniform format, for converting said plurality of video signals of non-uniform format to a plurality of video signals of a single common format, (c) a statistics gatherer, receiving said plurality of video signals of common format from said common format converter, for pre-encoding said plurality of video signals of common format having mutually independent timing, and for generating pre-encoding a priori statistics indicative of a complexity involved in pre-encoding each video signal of said plurality of video signals of common format, (d) a statistics computer, connected to said statistics gatherer, for statistically allocating a first bit rate to each video signal of said plurality of video signals of non-uniform format based on said pre-encoding a priori statistics generated in said statistics gatherer, (e) one or more encoders connected to said statistics computer for independently re-encoding each video signal of said plurality of video signals of non-uniform format to produce a corresponding compressed video bit stream depending on said first bit rate allocated in said statistics computer, and (f) a multiplexer for combining each of said compressed video bit streams with a least one other compressed video bit stream into a multiplexed bit stream.

16. The statistical multiplexer of claim 15, wherein:

said one or more encoders generates a posteriori statistics, regarding one or more video signals of said plurality of video signals of non-uniform format, for indicating a complexity involved in encoding each video signal of said plurality of video signals of non-uniform format, wherein said statistics computer statistically allocates a second bit rate to each video signal of said plurality of video signals of non-uniform format based on said a priori and a posteriori statistics generated by said statistics gatherer and said one or more encoders, and wherein said one or more encoders independently encodes each video signal of said plurality of video signals of non-uniform format depending on said second bit rate.

* * * * *